United States Patent
Kim et al.

(10) Patent No.: US 6,560,469 B1
(45) Date of Patent: May 6, 2003

(54) MICROPHONE/SPEAKER-CONTAINED WIRELESS REMOTE CONTROL SYSTEM FOR INTERNET DEVICE AND METHOD FOR CONTROLLING OPERATION OF REMOTE CONTROLLER THEREIN

(76) Inventors: Youngmin Kim, #92-142, Im-dong, Buk-ku, Kwangju (KR); Hyunbong Kim, 9-1209, Hanyang Apt., Apgujung-2-dong, Kangnam-ku, Seoul (KR); Jongdae Kim, 107-101, Jugong Apt., #129-19, Wonjong-2-dong, Ohjung-ku, Puchon-si, Kyonggi-do (KR)

( * ) Notice: Subject to any disclaimer, the term of this patent is extended or adjusted under 35 U.S.C. 154(b) by 0 days.

(21) Appl. No.: 09/572,662

(22) Filed: May 16, 2000

(30) Foreign Application Priority Data

Dec. 16, 1999 (KR) ............................................. 99-58354

(51) Int. Cl.⁷ ................................................ H04B 1/38
(52) U.S. Cl. ........................ 455/569; 455/556; 455/568; 709/217
(58) Field of Search ................................ 455/426, 552, 455/556, 568, 569, 420; 345/158, 169, 163, 156, 157; 709/217; 348/734

(56) References Cited

U.S. PATENT DOCUMENTS 5,706,031 A * 1/1998 Brendzel et al. ............ 345/172
6,209,034 B1 * 3/2001 Gladwin et al. ............ 709/227
6,289,099 B1 * 9/2001 Edgar, III ............... 379/374.01

* cited by examiner

*Primary Examiner*—William Trost
*Assistant Examiner*—Sharad Rampuria
(74) *Attorney, Agent, or Firm*—Birch, Stewart, Kolasch & Birch, LLP

(57) ABSTRACT

A microphone/speaker-contained wireless remote control system for an Internet device, comprising a system body and a remote controller, each of which includes a circuitry for performing a voice compression operation and modulating an analog audio signal into a digital signal. The remote controller further includes a speaker for transferring an audio signal from the Internet device to the user, and a microphone for receiving a user's voice. In the case where a singing room function is selected, the user's voice received by the microphone is processed in a digital manner. Radio frequency signals are transmitted and received between the remote controller and Internet device through antennas.

8 Claims, 4 Drawing Sheets

MICROPHONE/SPEAKER-CONTAINED WIRELESS REMOTE CONTROL SYSTEM FOR INTERNET DEVICE AND METHOD FOR CONTROLLING OPERATION OF REMOTE CONTROLLER THEREIN

BACKGROUND OF THE INVENTION

1. Field of the Invention

The present invention relates in general to remote controllers for a personal computer and other Internet devices, and more particularly to a microphone/speaker-contained wireless remote control system for an Internet device and a method for controlling the operation of a remote controller therein, in which the remote controller is adapted to transmit and receive digital signals to/from the Internet device.

2. Description of the Prior Art

With a growing interest in the Internet, the number of users connecting to the Internet through personal computers is recently on an explosively increasing trend. According to such a trend, television receiver manufacturers have developed television receivers capable of readily connecting viewers to the Internet therethrough.

As a result of the above developments, there have been marketed Internet television receiver products having an Internet phone function, a singing room function and other functions in addition to the original television receiver function.

However, in one such conventional Internet television receiver, because an Internet phone connected to the Internet television receiver is of either a wired type or wired/wireless type, the user has the trouble of moving to the Internet phone to speak over it.

On the other hand, in another conventional Internet television receiver, the user can connect a general telephone directly to the Internet television receiver, dial a telephone number using a remote controller and speak over it This technique does not utilize an Internet phone, but merely couples an existing telephone function with the Internet television receiver. For this reason, a separate telephone cable must be provided to allow the user to speak over the telephone while using an Internet function.

SUMMARY OF THE INVENTION

Therefore, the present invention has been made in view of the above problems, and it is an object of the present invention to provide a microphone/speaker-contained wireless remote control system for an Internet device and a method for controlling the operation of a remote controller therein, in which the remote controller comprises a microphone, speaker and signal modulation/demodulation circuit, for transmitting and receiving digital signals to/from the Internet device, thereby allowing the user to make a wireless telephone conversation over the remote controller or sing using it as in a singing room, resulting in a convenience to the user.

In accordance with the present invention, the above and other objects can be accomplished by a provision of a microphone/speaker-contained wireless remote control system for an Internet device, comprising a system body and a remote controller, each of which includes a circuitry for performing a voice compression operation and modulating an analog audio signal into a digital signal. The remote controller further includes a speaker for transferring an audio signal from the Internet device to the user, and a microphone for receiving a user's voice. In the case where a singing room function is selected, the user's voice received by the microphone is processed in a digital manner. Radio frequency signals are transmitted and received between the remote controller and Internet device through antennas.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
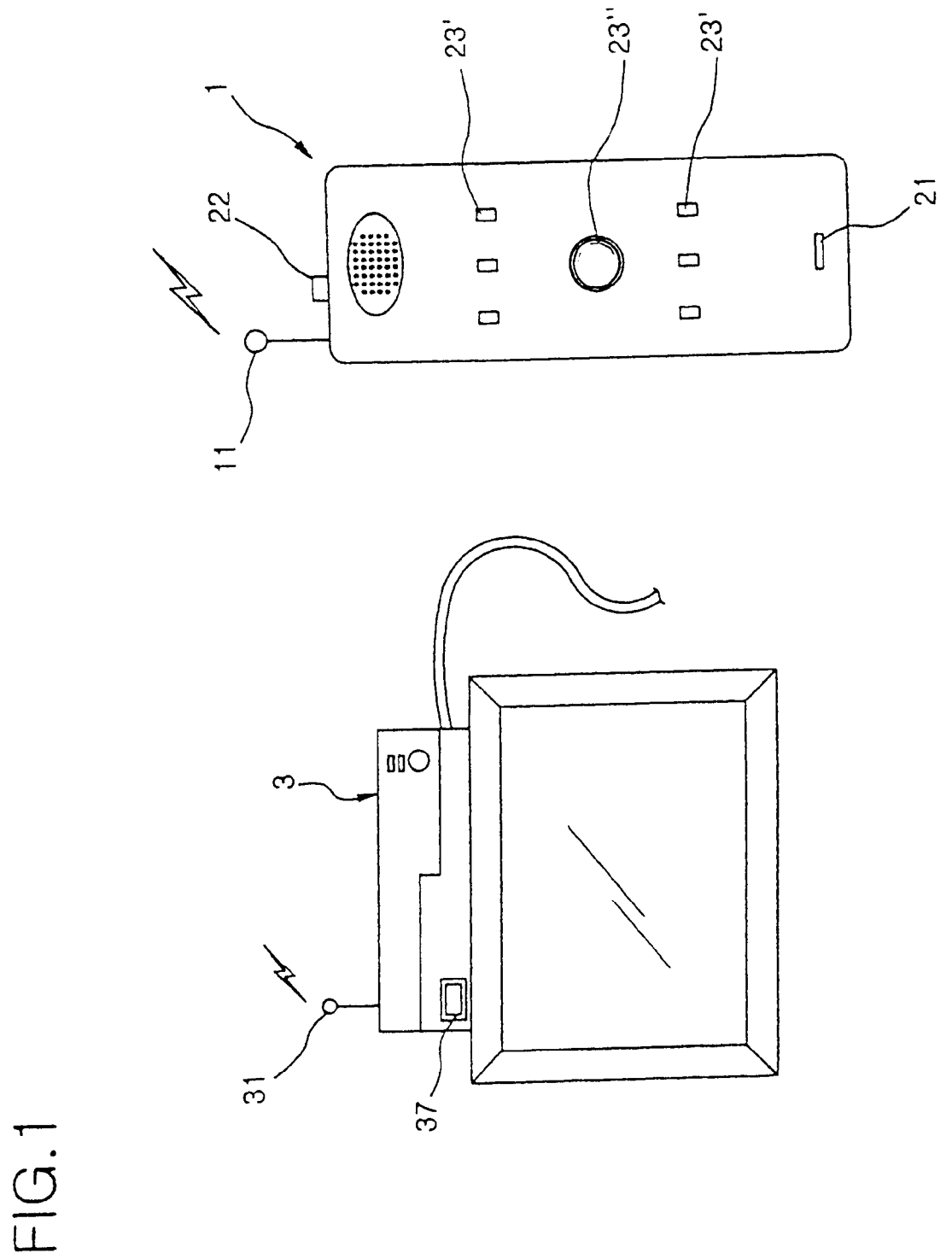
FIG. 1 is a view showing the appearance of a microphone/speaker-contained wireless remote control system for an Internet device in accordance with an embodiment of the present invention.

FIG. 1 is a view showing the appearance of a microphone/speaker-contained wireless remote control system for an Internet device in accordance with the present invention. As shown in this drawing, the wireless remote control system comprises a system body 3 including an infrared-ray receiver 37 for receiving an infrared-ray signal and a transmitting/receiving antenna 31 for transmitting and receiving radio frequency signals, and a remote controller 1 including an infrared-ray transmitter 22 for transmitting the infrared-ray signal to the infrared-ray receiver 37 in the system body 3 to remotely control the system body 3, a transmitting/receiving antenna 11 for transmitting and receiving the radio frequency signals to/from the transmitting/receiving antenna 31 in the system body 3, a plurality of key buttons 23' for applying various commands to the system body 3, and a track ball 23" acting as a mouse.

The system body 3 may preferably be a set-top box.

Figure 2:
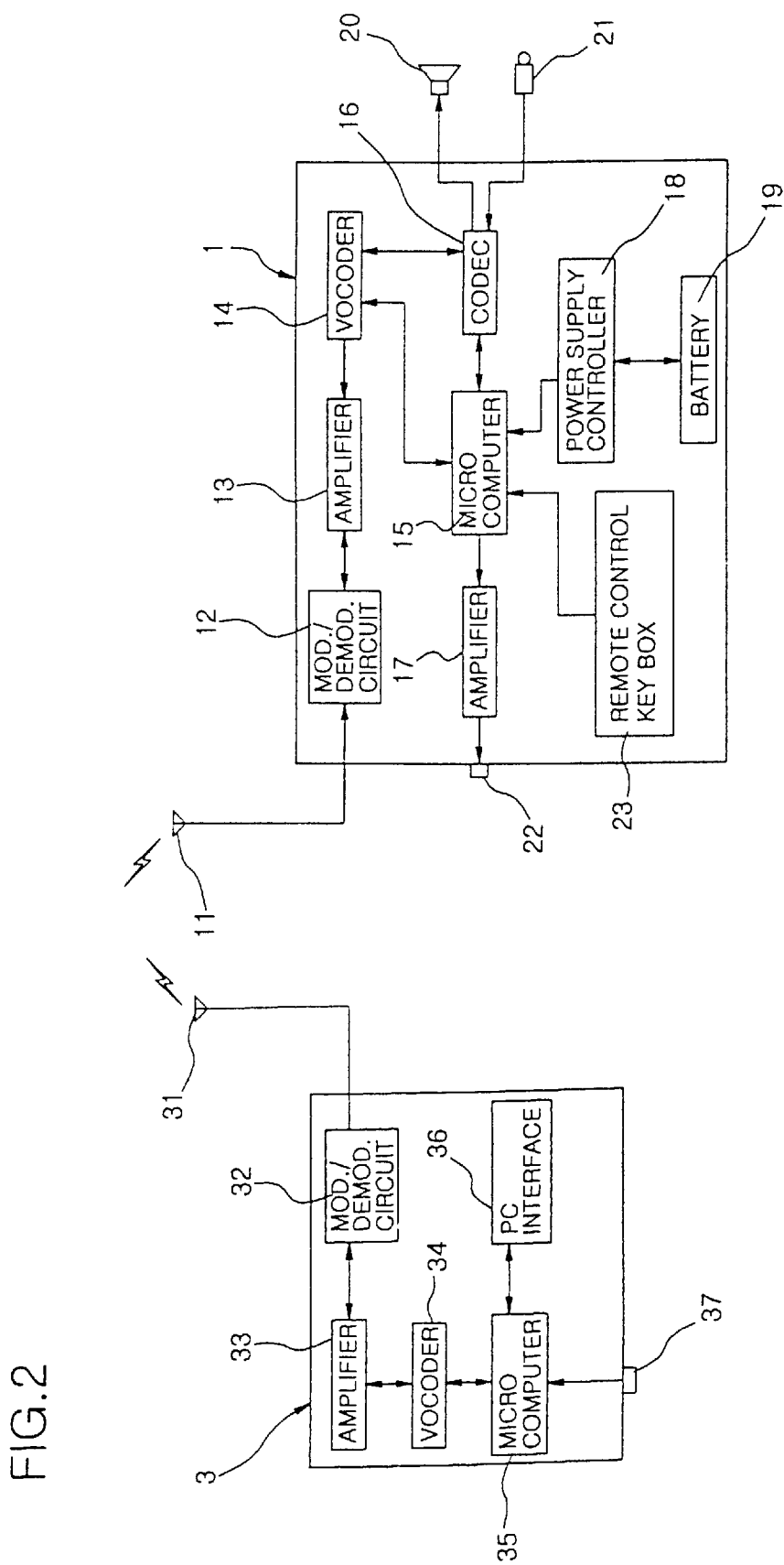
FIG. 2 is a block diagram showing an embodiment of the microphone/speaker-contained wireless remote control system for the Internet device in accordance with the present invention.

FIG. 2 is a block diagram showing an embodiment of the microphone/speaker-contained wireless remote control system for the Internet device in accordance with the present invention. As shown in this drawing, the body 3 of the wireless remote control system includes the transmitting/receiving antenna 31 which transmits and receives audio radio frequency signals to/from the transmitting/receiving antenna 11 in the remote controller 1. A modulation/demodulation circuit 32 detects an audio signal from the audio radio frequency signal received at the transmitting/receiving antenna 31 and rectifies the detected audio signal. An amplifier 33 amplifies an output signal from the modulation/demodulation circuit 32 to a predetermined level. A vocoder 34 decodes a compressed signal from the amplifier 33. A microcomputer 35 controls the entire operation of the system body 3 in response to an output signal from the vocoder 34, an output signal from the infrared-ray receiver 37 and a signal inputted through a personal computer (PC) interface 36. The PC interface 36 functions to perform a signal interfacing operation between the microcomputer 35 and a PC. The infrared-ray receiver 37 is adapted to receive an infrared-ray signal from the infrared-ray transmitter 22 in the remote controller 1.

The remote controller 1 of the wireless remote control system includes a codec 16 for converting an analog audio signal from a microphone 21 into a digital signal or converting a digital signal from a vocoder 14 into an analog signal and outputting the converted analog signal to a speaker 20. The vocoder 14 is adapted to voice-compress the digital signal from the codec 16 or decode a compressed signal from an amplifier 13. The amplifier 13 functions to amplify an output signal from the vocoder 14 to a predetermined level. A modulation/demodulation circuit 12 converts the signal amplified by the amplifier 13 into the audio radio frequency signal to be received at the transmitting/receiving antenna 31 in the system body 3. The transmitting/receiving antenna 11 is adapted to transmit and receive the audio radio frequency signals to/from the transmitting/receiving antenna 31. A power supply controller 18 acts to control charging/discharging of a battery 19. The key buttons 23' and track ball 23" are contained in a remote control key box 23 to generate electrical signals in response to user's operations. A microcomputer 15 is provided to convert an output signal from the remote control key box 23 into a digital code and output the converted digital code to the infrared-ray transmitter 22 through an amplifier 17.

In the wireless remote control system with the above-mentioned construction, the remote controller 1 performs a general function or voice communication with the system body 3 on the basis of the following algorithm according to a user's selection.

Figure 4:
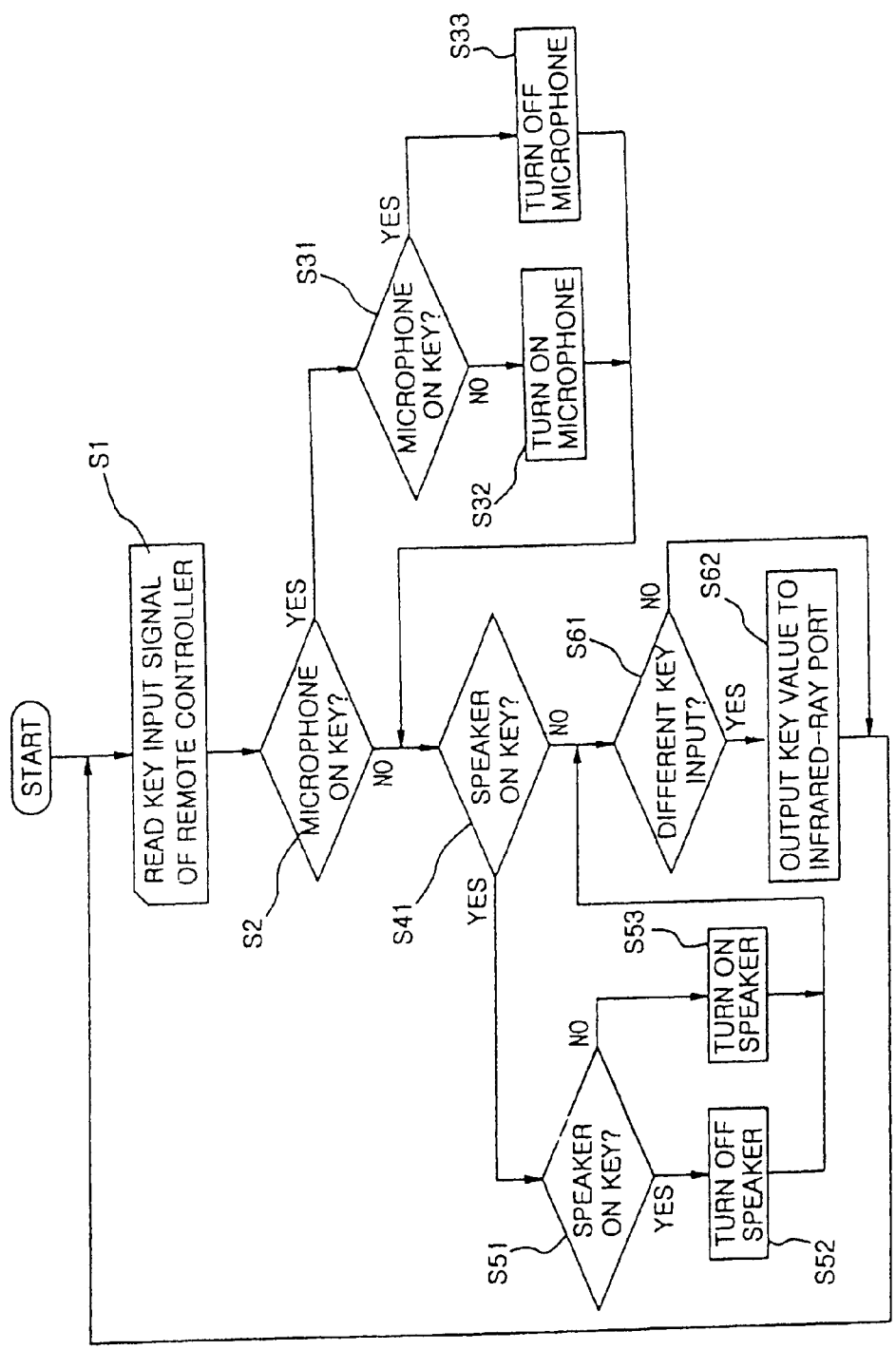
FIG. 4 is a flowchart illustrating a method for controlling the operation of a remote controller in the microphone/speaker-contained wireless remote control system for the Internet device in accordance with an embodiment of the present invention.

FIG. 4 is a flowchart illustrating a method for controlling the operation of the remote controller 1 in the microphone/speaker-contained wireless remote control system for the Internet device in accordance with an embodiment of the present invention, which is mainly executed by the microcomputer 15 in the remote controller 1.

First, the system is powered on and connected to the Internet. The user may watch a television or search the Internet for desired information under such a condition. If the user wishes to utilize a singing room function or transmit his voice to the system body 3 using the remote controller 1 while watching the television or searching the Internet, then he will push a desired one of the key buttons 23' on the remote controller 1.

Subsequently, the microcomputer 15 in the remote controller 1 reads a key input signal from the pushed key button on the remote controller 1 at step S1 and determines at step S2 in response to the read key input signal whether the user has pushed a microphone ON key to transmit his voice to the system body 3 using the microphone 21 in the remote controller 1.

If the microphone ON key has been pushed at the above step S2, then the microcomputer 15 determines at step S31 whether the microphone ON key has again been pushed by the user.

In the case where it is determined at the above step S31 that the microphone ON key has not again been pushed by the user, the microcomputer 15 turns on the microphone 21 and maintains its turned-on state, at step S32. However, if it is determined at the above step S31 that the microphone ON key has again been pushed by the user, the microcomputer 15 recognizes that the user does not use the microphone 21 and then turns off the microphone 21 at step S33.

On the other hand, when the user wishes to receive an output signal from the system body 3 through the speaker 20 in the remote controller 1, he will push a desired one of the key buttons 23' on the remote controller 1.

Then, at step S41, the microcomputer 15 in the remote controller 1 reads a key input signal from the pushed key button on the remote controller 1 and determines in response to the read key input signal whether the user has pushed a speaker ON key to receive an audio signal from the system body 3 through the speaker 20.

If the speaker ON key has been pushed at the above step S41, the microcomputer 15 determines at step S51 whether the speaker ON key has again been pushed by the user.

If it is determined at the above step S51 that the speaker ON key has not again been pushed by the user, the microcomputer 15 turns on the speaker 20 and maintains its turned-on state, at step S53. To the contrary, if it is determined at the above step S51 that the speaker ON key has again been pushed by the user, the microcomputer 15 recognizes that the user does not use the speaker 20 and then turns off the speaker 20 at step S52.

On the other hand, if the speaker ON key has not been pushed at the above step S41 or after the above step S52 or S53 is performed, the microcomputer 15 determines at step S61 whether a different key input signal has been generated. Upon determining at step S61 that the different key input signal has been generated, the microcomputer 15 converts the generated key input signal into a digital code and outputs the converted digital code to an infrared-ray port at step S62.

At this time, the different key input signal may be a command that the remote controller 1 transmits to the infrared-ray receiver 37 in the system body 3 through the infrared-ray transmitter 22 to select a different function of the Internet device.

In accordance with the above-mentioned method, the wireless remote control system can convert a digital signal based on an Internet phone function installed in a personal computer or any other Internet device into an analog audio signal. As a result, the user can make a telephone conversation over the microphone 21 and speaker 20 of the remote controller 1 through wireless communication with the system body 3.

Further, the microphone 21 of the remote controller 1 can be used as a wireless microphone for a computer associated function (for example, a singing room function).

Moreover, the user can listen to all audio signals from the system body 3 through the speaker 20 of the remote controller 1 anywhere.

Figure 3:
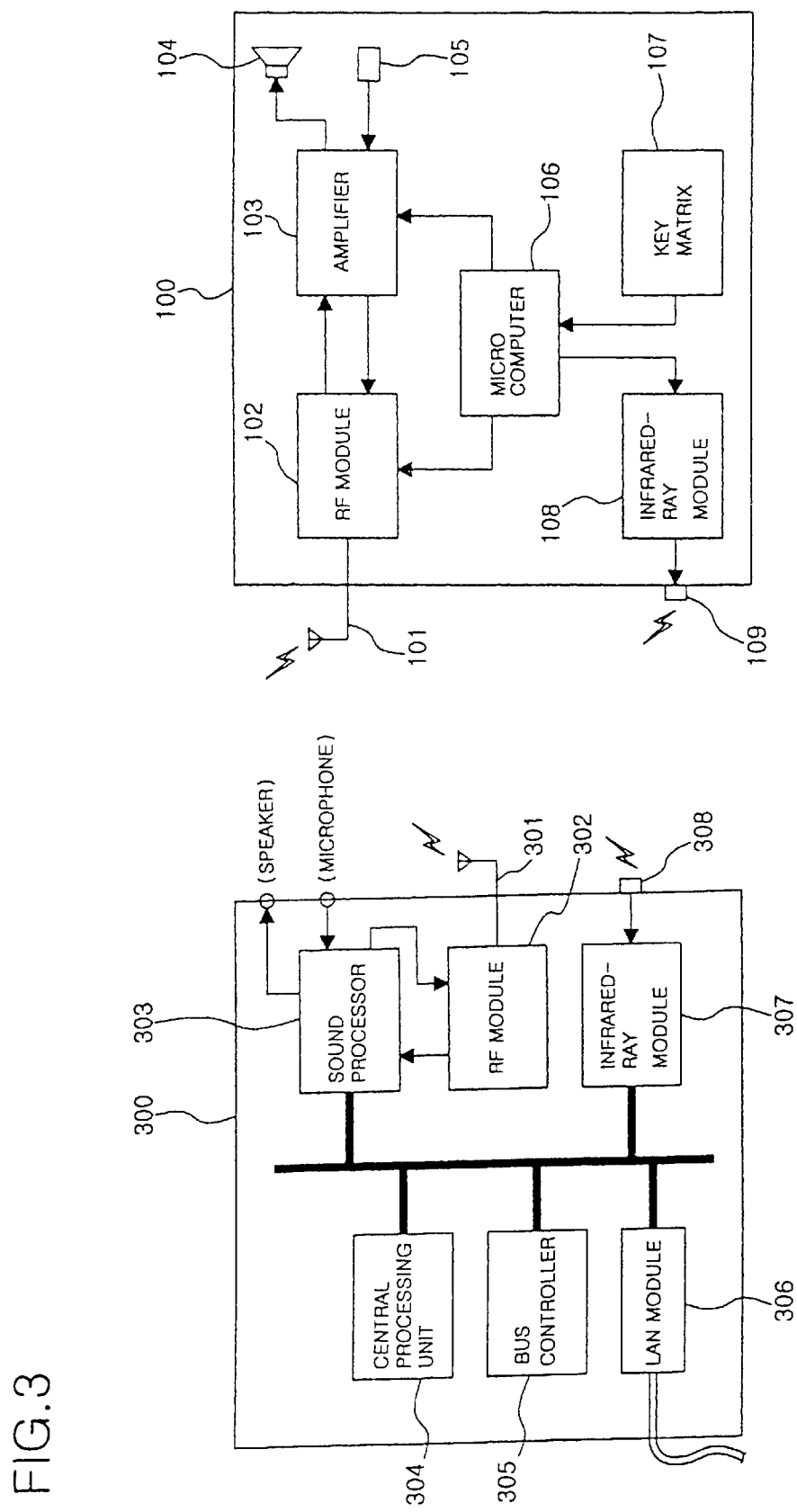
FIG. 3 is a block diagram showing an alternative embodiment of the microphone/speaker-contained wireless remote control system for the Internet device in accordance with the present invention.

FIG. 3 is a block diagram showing an alternative embodiment of the microphone/speaker-contained wireless remote control system for the Internet device in accordance with the present invention. As shown in this drawing, the wireless remote control system comprises a system body 300 and a remote controller 100 similarly to the first embodiment. The system body 300 includes a central processing unit 304 for controlling the entire operation of the Internet device, an infrared-ray receiver 308 for receiving an infrared-ray signal, an infrared-ray module 307 for converting the infrared-ray signal received by the infrared-ray receiver 308 into an electrical signal, a bus controller 305 for smoothly controlling a system bus, a local area network (LAN) module 306 for performing data communication based on an Internet communication protocol, a sound processor 303 for converting an input digital signal into an audio signal, and a radio frequency (RF) module 302 for converting an electrical signal from the sound processor 303 into an RF signal or an RF signal received at a transmitting/receiving antenna 301 into the digital signal to the sound processor 303.

The remote controller 100 includes a microcomputer 106 for controlling the entire operation of the remote controller 100, a key matrix unit 107 for combining input key signals, an infrared-ray module 108 for converting a control signal from the microcomputer 106 into the infrared-ray signal to be received by the infrared-ray receiver 308 in the system body 300, an infrared-ray transmitter 109 for transmitting the infrared-ray signal from the infrared-ray module 108 to the infrared-ray receiver 308, a microphone 105 for converting a user's voice into an electrical signal, a speaker 104 for converting an electrical signal into a sound, an amplifier 103 for amplifying the electrical signal to the speaker 104 or from the microphone 105 to a predetermined level, and an RF module 102 for converting an electrical signal from the amplifier 103 into an RF signal or an RF signal received at a transmitting/receiving antenna 101 into an electrical signal.

The operation of the second embodiment is performed as shown in FIG. 4 in the same manner as that of the first embodiment.

As apparent from the above description, a remote controller for an Internet device comprises a microphone, speaker and audio transmission/reception circuit, for transmitting and receiving audio signals to/from the Internet device, thereby allowing the user to make a telephone conversation over the remote controller conveniently without using a separate telephone line. Therefore, the present invention is very useful to the industry of manufacturing remote controllers for a variety of Internet devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A microphone/speaker-contained wireless remote control system for an Internet device comprising:

a remote controller including a microphone, a speaker, a codec for converting an analog audio signal from the microphone into a digital signal or converting a digital signal from a second vocoder into an analog signal and outputting the converted analog signal to the speaker, said second vocoder voice-compressing the digital signal from said codec or decoding a compressed signal from a second amplifier, said second amplifier amplifying an output signal from said second vocoder to a second predetermined level, a second modulation/demodulation circuit for converting the signal amplified by said second amplifier into an audio radio frequency signal, a second transmitting/receiving antenna for transmitting and receiving the audio radio frequency signals to/from a first transmitting/receiving antenna, a power supply controller for controlling charging/discharging of a battery, a remote control key box having a plurality of key buttons and a track ball for generating electrical signals in response to user's operations, a second microcomputer for converting an output signal from said remote control key box into a digital code, wherein the microphone and the speaker of the remote controller are each selectively activated by different key buttons of the plurality of key buttons.

2. A microphone/speaker-contained wireless remote control system for an Internet device comprising:

a system body including a central processing unit for controlling the entire operation of said Internet device, an infrared-ray receiver for receiving an infrared-ray signal, a first infrared-ray module for converting the infrared-ray signal received by said infrared-ray receiver into an electrical signal, a bus controller for controlling a system bus, a local area network module for performing data communication based on an Internet communication protocol, a sound processor for converting an input digital signal into an audio signal, and a first radio frequency module for converting an electrical signal from said sound processor into a radio frequency signal or a radio frequency signal received at a first transmitting/receiving antenna in said system body into the digital signal to said sound processor; and a remote controller including a microcomputer for controlling the entire operation of said remote controller, a key matrix unit for combining input key signals, a second infrared-ray module for converting a control signal from said microcomputer into the infrared-ray signal to be received by said infrared-ray receiver in said system body, an infrared-ray transmitter for transmitting the infrared-ray signal from said second infrared-ray module to said infrared-ray receiver, a microphone for converting a user's voice into an electrical signal, a speaker for converting an electrical signal into a sound, an amplifier for amplifying the electrical signal to said speaker or from said microphone to a predetermined level, and a second radio frequency module for converting an electrical signal from said amplifier into a radio frequency signal or a radio frequency signal received at a second transmitting/receiving antenna in said remote controller into an electrical signal, wherein the microphone and the speaker of the remote controller are each selectively activated by different key buttons.

3. A method for controlling the operation of a microphone/speaker-contained wireless remote controller for an Internet device, comprising the steps of:

a) reading a key input signal of said remote controller;

b) determining in response to the read key input signal whether the user has pushed a microphone ON key to transmit his voice using a microphone in said remote controller;

c) determining whether said microphone ON key has again been pushed by the user, if it is determined at said step b) that said microphone ON key has been pushed;

d) turning on said microphone if it is determined at said step c) that said microphone ON key has not again been pushed and then maintaining said microphone at its turned-on state;

e) recognizing that the user does not use said microphone, if it is determined at said step c) that said microphone ON key has again been pushed, and then turning off said microphone;

f) determining whether a speaker ON key has been pushed by the user, if it is determined at said step b) that said microphone ON key has not been pushed or after said step d) or e) is performed, wherein the speaker ON key is different from the microphone ON key;

g) determining whether said speaker ON key has again been pushed by the user, if it is determined at said step f) that said speaker ON key has been pushed;

h) turning on a speaker in said remote controller if it is determined at said step g) that said speaker ON key has not again been pushed and then maintaining said speaker at its turned-on state;

i) recognizing that the user does not use said speaker, if it is determined at said step g) that said speaker ON key has again been pushed, and then turning off said speaker;

j) determining whether a different key input signal has been generated, if it is determined at said step f) that said speaker ON key has not been pushed or after said step h) or i) is performed; and k) if it is determined at said step j) that the different key input signal has been generated, converting the generated key input signal into a digital code and outputting the converted digital code to an infrared-ray port.

4. The method of claim 3, wherein said microphone and said speaker in said remote controller are each selectively turned on/off using different keys.

5. The system of claim 1, further comprising:

a system body including the first transmitting/receiving antenna for transmitting and receiving the audio radio frequency signal, a first modulation/demodulation circuit for detecting an audio signal from the audio radio frequency signal received at said first transmitting/receiving antenna and rectifying the detected audio signal, a first amplifier for amplifying an output signal from said first modulation/demodulation circuit to a first predetermined level, a first vocoder for decoding a compressed signal from said first amplifier, an infrared-ray receiver for receiving an infrared-ray signal, and a first microcomputer for controlling the entire operation of said system body in response to an output signal from said first vocoder, an output signal from said infrared-ray receiver and a signal inputted through a personal computer interface, said personal computer interface performing a signal interfacing operation between said first microcomputer and a personal computer.

6. The system of claim 5, wherein the remote controller further includes a third amplifier for amplifying an output signal from said second microcomputer to a third predetermined level, and an infrared-ray transmitter for transmitting an output signal from said third amplifier as said infrared-ray signal to said infrared-ray receiver in said system body.

7. The system of claim 1, wherein the remote controller turns off only the microphone of the remote controller if a first designated key button of the key buttons is activated twice.

8. The system of claim 7, wherein the remote controller turns off only the speaker of the remote controller if a second designated key button of the key buttons is activated twice, wherein the first and second designated key buttons are different key buttons.

* * * * *